United States Patent [19]

Bredt

[11] 4,031,841

[45] June 28, 1977

[54] CONTROLLED AIR FILM HULL FOR WATERCRAFT

[75] Inventor: Mainhardt Bredt, New Orleans, La.

[73] Assignee: Bredt-Kat, Inc., New Orleans, La.

[22] Filed: June 30, 1975

[21] Appl. No.: 592,042

Related U.S. Application Data

[63] Continuation-in-part of Ser. No. 419,087, Nov. 23, 1973, abandoned, which is a continuation-in-part of Ser. No. 875,430, May 25, 1970, abandoned.

[52] U.S. Cl. .............................................. 114/67 A
[51] Int. Cl.² ......................................... B63B 1/38
[58] Field of Search ................. 114/67 A, 67 R, 61, 114/66.5 S

[56] References Cited

UNITED STATES PATENTS

| | | | |
|---|---|---|---|
| 1,824,313 | 9/1931 | Vogler | 114/67 A |
| 1,831,339 | 11/1931 | Brush | 114/66.5 S |
| 3,382,678 | 5/1968 | Reh | 114/67 A |
| 3,547,064 | 12/1970 | Glass | 114/66.5 S |
| 3,606,857 | 9/1971 | Sundquist | 114/67 A |

*Primary Examiner*—Trygve M. Blix
*Assistant Examiner*—Stuart M. Goldstein
*Attorney, Agent, or Firm*—Pugh & Keaty, Ltd.

[57] ABSTRACT

A planing hull for high speed water-craft polysectionally contoured to provide a simple deep vee bow section that develops functionally from a compound vee section to a flattened base at the step-lift having controlled air film supply to break the step-lift generated vacuum and to provide an air film support and pathway for a trailing-and-air-film-confining hull portion after the step-lift.

18 Claims, 10 Drawing Figures

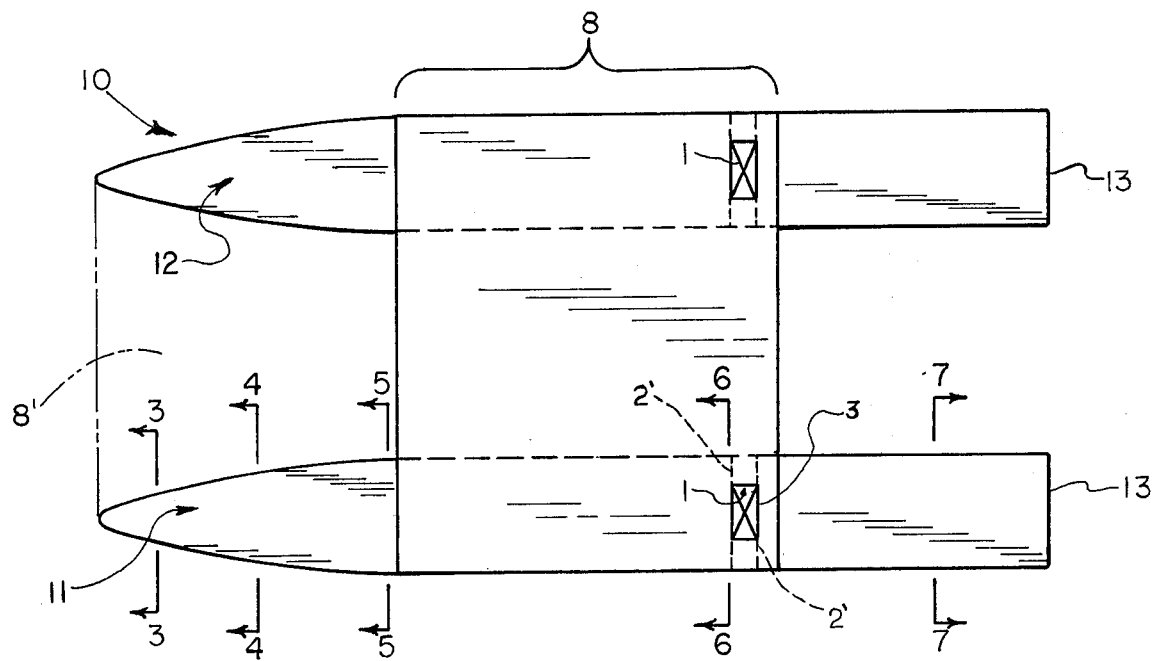
FIG. 1
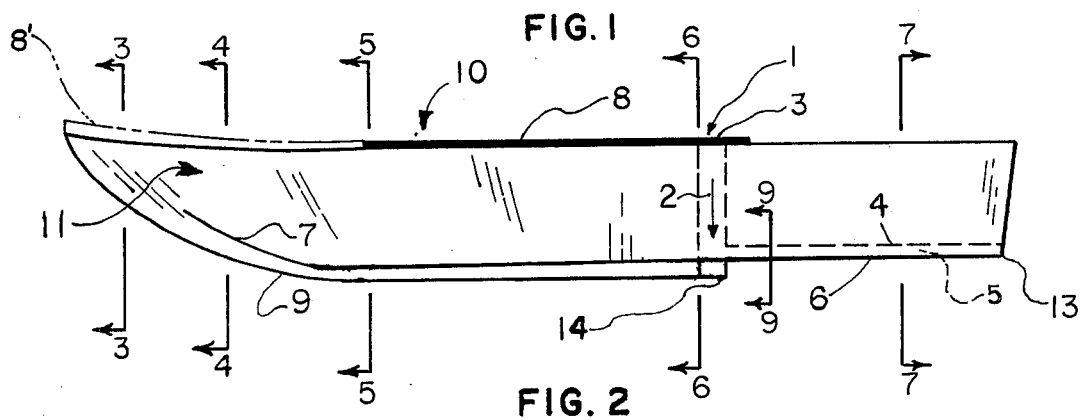
FIG. 2
 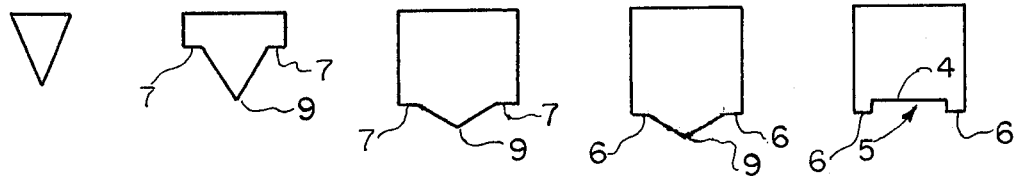
FIG. 3    FIG. 4    FIG. 5    FIG. 6    FIG. 7

CONTROLLED AIR FILM HULL FOR WATERCRAFT

REFERENCE TO RELATED APPLICATION

This application is a continuation-in-part of the prior, copending application Ser. No. 419,087 filed Nov. 23, 1973, which in turn in a continuation of application Ser. No. 875,430, filed May 25, 1970, both entitled "Multi-Hull Boats" and both abandoned.

BACKGROUND OF THE INVENTION

1. Field of the Invention

The instant invention relates to the hull design of water-craft. More particularly it relates to the hull design of high-speed water-craft of the planing type as opposed to water-craft with displacement type hulls.

2. Discussion of Prior Art

Planing type hulls for water-craft are generally old and the use of the forward motion of the hull to raise the water-craft partially out of the water and thereby reduce hull to water friction is well understood. Examples of the more highly developed and sophisticated designs are racing hydroplanes and the floats or pontoons of seaplanes. Water-craft of the planing type are quite different from water-craft with displacement hulls. The former are usually lightly constructed and exhibit a relatively flat bottom designed to present an angle of attack to the water when driven at high speed. The force of the water against the flat and angled bottom raises the hull up and out of the water where it will skim over the surface much as a flattened rock when skipped across the water by a child at play. When the speed of the rock decreases below a certain critical speed, the rock sinks. Just so does the planing hull when the applied propulsion power drops below that amount required to keep the water-craft "on plane."

Water-craft of the displacement hull type, as the name suggests, displace a volume of water equal in weight to the total weight of the water-craft. A displacement type hull moving through the water must continuously move this amount of water aside in order to make progress. As speeds increase, the resistance of the water to being moved aside increases drastically until the "hull speed" or that speed beyond which it is impossible to drive the hull regardless of expended power is reached.

A water-craft of the planing type, if driven with sufficient propulsion power to get "on plane", will ride atop the surface of the water without displacing anything near its own weight of water. A water-craft "on plane" can utilize propulsion power to achieve speed.

It is characteristic of conventional planing type water-craft that inordinate amounts of propulsion power must be expended simply to raise the hull partially out of the water and to get the water-craft on plane. Once the craft is on plane, the applied driving force at once becomes more effective to produce speed.

It is to the design of planing hulls for water-craft that this invention is directed. An accepted design of demonstrated efficiency for planing hulls is a conventionally developed bow and midship section extending approximately two-thirds of the total hull length. At this point is located the "step", which is simply an abrupt vertical displacement of the bottom from which the displacement the trailing one-third of the hull continues aft to the stern.

Operation of the stepped planing hull is simplicity itself. The stepped planing hull is driven foward with sufficient applied propulsion power to achieve a speed such that the upward pressure of the water acting on the submerged bow and midship sections raises the hull to the extent that only those hull sections forward the step ride in the water. At this point not only has the total water displacement of the hull been markedly reduced, but the entire aft one-third of the hull has been lifted and freed from the drag of the water. The hull, riding the water in this particular aspect is said to be, on the step, or on plane.

Simple as the stepped planing hull appears to be in execution and mode of operation, certain inherent problems beset the practitioners of planing hull art at the outset.

It was discovered early in stepped-hull development that higher propulsion power seemed to be required just prior to the moment the hull section trailing the step lifted free and the hull went on plane. Investigation determined that a stubborn vacuum formed immediately aft the step and held the hull so tenaciously to the water at speeds that should have produced planing that it was by no means uncommon for sea-planes to find take-off in smooth water quite impossible. This situation gave rise to the technique of churning up the surface of the water and taking-off across the sea-plane's own disturbed wake using the induced waves as a means for breaking the hull loose from the water.

Subsequently, it was discovered that air streams could be directed through the planing hull and discharged into the vacuum that developed aft the step-lift of the hull.

U.S. Pat. No. 1,812,265 (Hone, issued June 30, 1931) is one of several inventions directed to the problem of breaking the vacuum that forms immediately after the hull step. This patentee simple employed streams of air diverted through openings in the hull to break the vacuum by the hull step and once this particular function was accomplished the patentee ignored the ultimate fate of the air used to break the vacuum. A somewhat similar patent is U.S. Pat. No. 1,712,281 (Royer, issued May 7, 1929) wherein air streams induced to enter beneath the hull bottom to a location adjacent the hull step are used to eliminate the vacuum induced by the hull step. This particular patentee trapped the air subsequent to its use for breaking the hull step vacuum and created therewith an air cushion between the two pontoons of his speed boat hull with air discharge severely restricted at the stern by means of the sternsheet.

Restriction of air discharge is of course essential if the intent, as here in the present invention, is primarily the provision of an air film for the stern sections of the hull abaft the step.

Other related patents are U.S. Pat. No. 3,547,064 (Glass, issued Dec. 15, 1970) and 3,606,857 (Sundquist, issued Sept. 12, 1971). Glass uses an air flow system at the rear of a monohull boat which is, generally speaking, laterally unconfined and does not produce a thin, flat air film flow. Sundquist uses a pressurized air jet propulsion system for a catamaran wherein pressurized air jets flow from the bow all the way along the full length of the hull which is canted upwardly and is not horizontally disposed.

Examples of other air-friction reducing systems for hulls are shown in U.S. Pat. Nos. 1,824,313 (Vogler, issued Sept. 22, 1921) and 1,831,339 (Brush, issued Nov. 10, 1931). Vogler uses a monohull aerating system with longitudinal fins; however there are no outboard fins and the fins do not extend to the stern. Brush uses air bleeder tubes on a hydroplane which put air in only the central portion of the hull, and the central stern portion of the hull thereafter flows upwardly, rather than being flat.

As to catamaran hulls with pivoting hulls, reference is had to U.S. Pat. No. 3,509,842 (Mitchell, issued May 5, 1970).

3. GENERAL DISCUSSION OF THE INVENTION

In the present invention it has been discovered and it is to this discovery that the disclosure following is directed, that the streams of air initially diverted through the hull into the area adjacent the hull-step for the particular purpose of breaking the step-induced vacuum can thereafter be channeled under the after-hull sections abaft the step, occluded laterally and vertically and with free discharge of the rear, thereby to form a thin air-film upon which the after-hull sections can ride virtually without friction. It is important to note that the thin air-film which is an essential of this invention is not an air cushion with all the inherent turbulence associated with air cushions by virtue of the necessity of trapping and compressing air for the production of a cushion. Instead, according to the instant invention, air diverted through the hull to the area of the step induced vacuum exits onto the flat surface of the aft one-third of the hull where, with only lateral and vertical restraints, it forms a thin air film between the entire after-hull sections and the water with the result that these air supported hull surfaces can be said to be air-film lubricated. Additionally, it has been found that for the greatest effectiveness control of the air flow stream in the amount and intensity of air stream flow to the film area is also most important.

As to prior art hull designs, most multi-hull boats start with a deep "V" forward and wind up at the stern in a shallow "V" or "U" shaped cross-section. This causes a suction effect at the stern area at high speeds holding the hull down in the water. Although some have a step-life which helps break down some of the suction effect, the present invention utilizes air flowing through the step-lift substantially across the entire beam which eliminates the suction of the hull and at the same time provides the underside with a thin, flat film (not a cushion) which reduces skin friction. By using a laterally confined air film section or area, the air film in the present invention remains in place along substantially all of the hull bottom from the step-lift during planeing.

The air is channeled from the deck area to the step-lift where it exits onto the flat, laterally confined surface of the rear one-third of the hull, all the way to the stern or transom, thus putting an air film on substantially all of the load bearing surface which greatly reduces friction and eliminates the usual vacuum or suction effect which normally is still present to some degree in prior art step-lifts.

The present invention is ideally suited for planing-type multi-hull boats, such as for examples catamarans, trimarans, etc., wherein the multiple hulls are separate pontoon-type hulls laterally disposed in parallel array.

In using the same weight boat and horsepower, the use of the present invention can increase the boat speed a hundred percent.

BRIEF DESCRIPTION OF THE DRAWINGS

For a better understanding of the nature and objects of the invention, reference should be had to the following detailed description, taken in conjunction with the accompanying drawings, in which like parts are given like reference numerals and wherein:

FIG. 1 is an over-all, simplified, plan view of a catamaran water-craft embodying the hull design and air film system that is the subject of this invention.

FIG. 2 is a side view of the embodiment of FIG. 1, showing the vertical air channel and horizontal air film area of the near pontoon in phantom line.

FIGS. 3 – 7 are profile views taken laterally along various sections of the entire length of one pontoon, showing a series of hull cross-section profiles, the profiles being taken at the indicated profile lines of FIGS. 1 and 2.

DETAILED DESCRIPTION OF THE PREFERRED EMBODIMENT

Figure 8A:
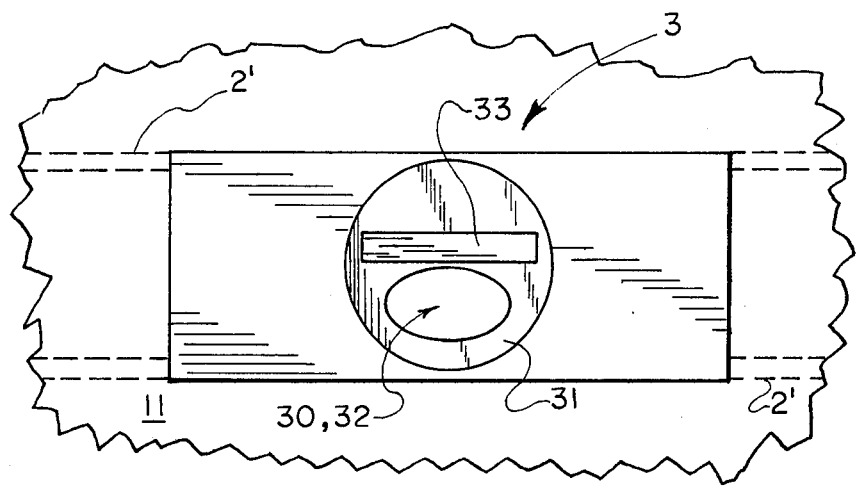
FIGS. 8A and B are partial, plan, close-up views of the air control valve located on the top of the pontoon hull of FIG. 2, which as shown only symbolically in FIGS. 1 and 2, FIG. 8A showing the valve completely open and 8B showing it partially closed.

As illustrated in FIG. 1, one of the preferred embodiments of the present invention is the application of the improved planing hull design and air film system to a catamaran water-craft 10 having two identical pontoons 11 and 12 bridged by a deck 8.

The over-all hull design of each pontoon 11, 12 is a single step-lift planing hull wherein the step 14 is located substantially athwartship (note FIG. 6) approximately two-thirds the distance aft from the bow towards the stern. The specifics of the hull design can best be seen in the hull profile views of FIGS. 3 – 7.

Chines 7 are formed on both sides of the keel line 9 of the pontoon hull and begin shortly aft the bow. The chines 7 move down below the "stationary/floating" water line (not illustrated) and flow smoothly into the side, flat, parallel, relatively narrow, edge protrusions 6 which extend all the way to the stern 13 of the hull. The protrusions or parallel, vertical extensions 6 are in effect chine lines continued aft from the step-lift and are not important. They serve the additional function of keeping the air film which is delivered aft at the step-life 14 from escaping laterally from under the hull portion behind the step-lift. These parallel protrusions 6 retain the thin air-film which provides an almost frictionless support in the air film area 5 for the aft one-third of the stepped planing hull which is part of the main object of the present invention.

The step-lift 14 is at a right angle to the longitudinal axis of the hull, and the horizontal, flat hull bottom 4 with the horizontally flat bottomed protrusions extending approximately one-third up from the stern or transom 13, most preferably within a range of ± 10%. Although the hull bottom 4 is most preferably flat, some concavity is possible. Forward of the step-lift 14, the hull bottom starts in a narrow V cross-section (note FIG. 3) and gradually flattens out into a shallow, flat dihedral at the step-lift 14 (note FIGS. 6 and 7).

The air film in the horizontal, aft hull section 5 is supplied by means of a box-shaped air channel 2, rectangular in horizontal cross-section, extending vertically down through the hull and formed by parallel, lateral partitions 2'. The vertical air channel 2 communicates with an air intake opening 1 at its upper end and the air film area 5 at its lower end 14'. As the boat moves forward, the water passing by the step-lift 14 acts as an aspirator drawing down the air through the opening 1, and no supplemental power or pressurization is needed to supply the air.

A valve 3 is included at the top of the air intake opening 1 for controlling the amount and intensity of the air flow stream down through the air channel 2 to the air film area 5. Because the amount of air in the air film area 5 is to some degree critical for maximum effectiveness and because this can vary due to the varying air stream flow in opening 1 and channel 2 created at different boat speeds, the presence of control valve 3 is considered very important and part of the main object of the present invention. The presence of too much air can defeat the objectives of the present invention and can for example create "porpoising" of the hulls.

Figure 9:
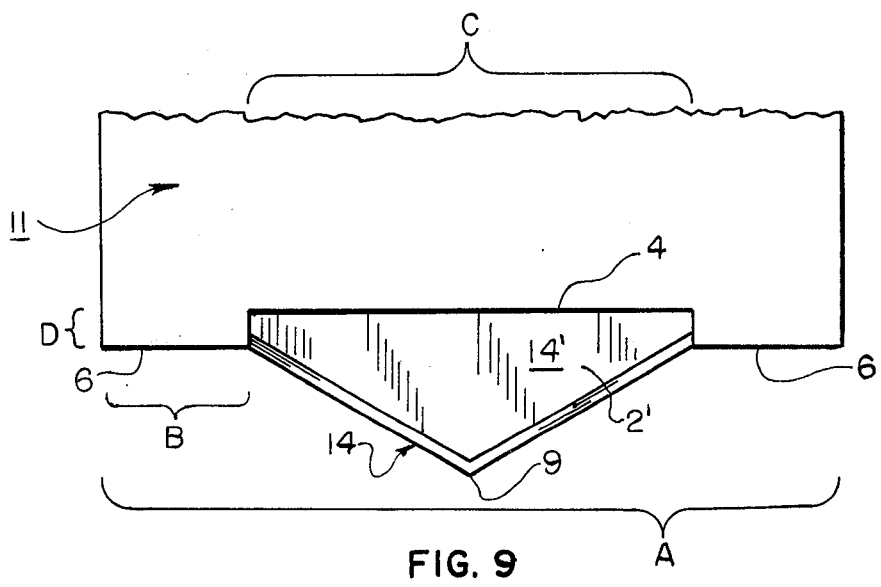
FIG. 9 is a partial, sectional view taken laterally through the hull at section lines 9—9, showing in close-up view the bottom air opening into the bottom portion of the aft hull section.

Once the air leaves the channel 2 through the completely open, triangular bottom opening 14' (note FIG. 9) at the step-lift 14, it is flattened out to a film over the entire confined underside area 5 of the rear one-third of the hull defined by the protrusions 6 and the flat hull underside 4, and the air film then exits out rearwardly at the stern 13. This thin air film acts as a lubricant in such a manner that the water flow does not actually touch the hull in the confined air film area 5, yet the water's upward pressure is felt.

It should be understood and appreciated that the lifting force on the hull in the present invention is neither air flow as a tunnel hull design nor a force-fed air cushion as in a "Bell" type system. In the present invention, the lifting force is water across the entire beam of the hull, but the presence of the air film at area 5 eliminates almost all of the planing hull area except for the relatively small bottoms of the protusions 6, and, as a result eliminates the drag and friction of the water and the vacuum created at the step-lift 14.

In a catamaran, in order to get the same pay load lift of a monohull displacement boat, the combined and sum total of the widths of the hulls of the catamaran design should equal the width, admidship, of the monohull. Ordinarily, without the present invention, this would drag so much it would not plane and remain a displacement boat. But, the air film created and introduced into the flat, aft hull area 5 reduces friction to such an extent it can go into planing attitude at low speed, i.e. the water forces the hulls up. This contrasts and should not be confused with a hydroplane which races on calm lakes. Hydroplanes are light, over powered to the extent that the air is compressed between the hulls (since the deck is the same length as the boat) and is lifted to planing attitude by a cushion of air at high speed only. But in rough water the closeness of the underside of the deck to the waves would cause it to break up. In order to soften the flat rear of the hull design of the present invention from pounding in rough water, it is necessary at the step lift 14 to change from a flat surface to a shallow "Vee" (note FIG. 6). Moving forward to FIG. 5, the bottom becomes more inclined. By the hull portion of FIG. 4, it is indeed a deep "Vee". This entry does indeed split open large waves so little pounding is felt at the rear one-third. Along with these underwater features, another problem is met. Rough water at high speed could tear the deck 8 up, so in the preferred design illustrated, the deck 8 as shown in FIGS. 1 & 2 starts about one-third of the boat length back from the bow. Furthermore, it ends one-third of the distance from the stern 13. In order to avoid high waves, the deck 8 must be at least as high from the bottom 9 as the hull is wide. Furthermore, it is preferrably thin and flexible. This flexibility allows the hulls 11, 12 to flex up and down, independent of each other. To get this flexibility, the space between the hulls 11, 12 usually should be a minimum of the sum of the hull widths. It then follows that pay loads are carried in the hulls. Any superstructure above the deck should remain flexible to the extent that it does not interfere with the independent hulls flexing in rough seas.

The foregoing hull and air film system modifications were incorporated into an ocean-going type, molded fiberglass catamaran 25 feet long with a ten foot beam, powered by dual outboard motors and having the same general hull configuration of the boat 10 illustrated (but without control valve 3). The following projected performance and range data demonstrate the extraordinary capabilities of the modified planing hull that is the subject of this invention in comparison with contemporary conventional planing hull water-craft.

|  | Shallow "V" (one 24' monohull) | Deep "V" (one 24' monohull) | Catamaran (24' twin hulls 10) |
| --- | --- | --- | --- |
| Propulsion | 1–100 H.P. | 2–160 H.P. | 2–135 H.P. |
| Speed (max) | 30 M.P.H. | 45 M.P.H. | 60 M.P.H. |
| Payload | 1500 lbs. | 1200 lbs. | 2000 lbs. |
| Range | 150 miles | 150 miles | 1000 miles |

Additionally tests were recently made using the same boat 10, but with control valve 3 and using twin Chrysler engines (135 H.P. each) turning standard three bladed 13 × 19 inch propellers at 5,000 RPM with a gross weight of 4,000 lbs. Slippage under these circumstances was not over 12 percent, and with appropriate propeller changes should be under ten percent. By properly regulating the control valve 3, all porpoising was eliminated and the boat remained steady in the water at speeds in excess of 50 mph.

On test runs made with a hand operated valve 3, maximum speed was 43 mph with wild porpoising with the air valve being completely open, and was 30 – 32 mph with flat planing with the air valve completely closed. In the former too much air pressure was present, while in the latter there was of course no air pressure. With the valve opened to the optimum amount (determined by testing), the boat ran flat in excess of 50 mph without any porpoising. The boat under these optimum conditions did not rear up and the keel line 9 of the bottom of the hull remained at least generally parallel to the surface under all conditions. Although the exact amount of optimum air pressure will vary depending on conditions such as speed and load factor desired and sea state, simple "trial-and-error" testing will determine the optimum valve setting in each set of conditions and circumstances.

Figure 8B:
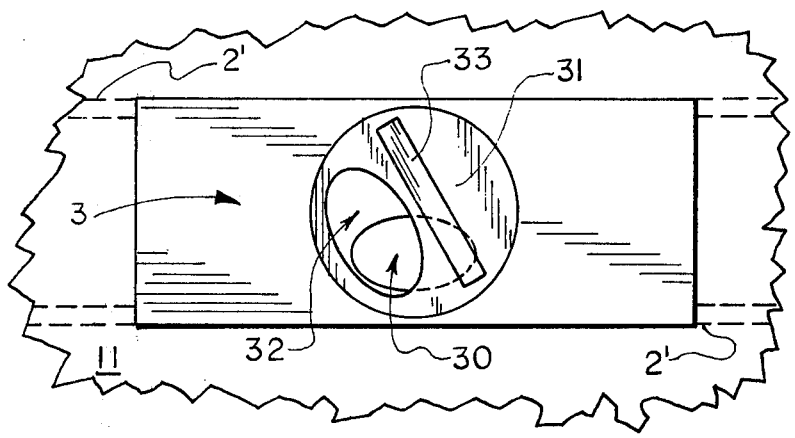

A suitable air flow control valve 3, as used in the tests, is shown in close-up detail in FIGS. 8A and 8B. The upper opening 30 (corresponding to element 1 of FIGS. 1 & 2) into the channel 2 is oval in shape and has above it a rotatable top 31 having a like oval opening 32 in it. As the top 31 is rotated (note curved arrows) the two openings 30, 32 either become more aligned (allowing more air to enter channel 2) until the full opening 30 is exposed (FIG. 8A) or less aligned (allowing less air to enter channel 2) until the opening 30 is completely closed. It is noted that in the relative position of the top 31 to the opening 30 shown in FIG. 8B, clockwise rotation would reduce the air flow, while counter-clockwise rotation would increase it. A suitable handle 33 is provided for ease in manipulating the valve 3.

As pointed out above, having a confined, flat thin air film over substantially all of the bottom of the aft hull portion 5 is most important to the present invention. The particular dimensions and structure which produce this effect in the preferred embodiment illustrated, will now be discussed with reference to FIG. 9. The hull 11 in its aft one-third area has a total beam of 30 inches (dimension A), with the width of each of the parallel edge protrusions 6 being (2½) (dimension B), leaving a width for the aft hull portion 5 of 25 inches (dimension C). The vertical depth of the hull portion 5 from the step 14 to the stern transom 13 is a flat ⅝ inch (dimension D). Thus, as to beam, the aft hull portion 5 includes substantially all the hull 11 (83.3% in the preferred embodiment illustrated and tested). Although some variation in the above dimensions are of course possible, the present invention does not lend itself to precisely defining critical range limitations, and the generally expected ranges for one particular hull design would not necessarily be the same for a different specific hull design. However, as to the preferred embodiment illustrated and described in detail in the foregoing specification, it was found during tests that a suitable range for dimension D seemed to be between ¾ – ½, and that depths of ⅜ and ¼ did not work. Ideally dimension B should be as narrow as possible, consistent with maintaining sufficient structural strength and rigidity. It is projected that any dimension B less than 80% of the hull beam (dimension A) would negate the substantial advantages of the present invention. It is also projected that dimension D should have a ratio to dimension A of approximately 1:50.

It is further noted that, although the bottoms of the edge protrusions 6 are illustrated as being flat, some degree of concavity is possible to serve as a further restriction to lateral air film loss. Convexity of the protrusions 6 is generally not desirable as such rounded edge shape would have a greater tendency to allow lateral air film escape.

It is noted that, in rough seas, the hull design of the preferred embodiment in its narrow entry (note FIGS. 3 and 4) slices through the water and does not porpoise like a deep "V" hull. Also pounding under full power is relatively mild. For this reason the principals of the present invention will work better on a catamaran than a single hull when seas are rough.

It is also further noted that a secondary lifting effect on the boat 10 is caused by air being trapped between the hulls 11, 12 under the deck 8, but this is only effective after planing and the boat speed is over 60 mph. This lift acts more as a cushioning or softening effect as the boat comes down in rough seas. This cushioning effect (not to be confused with the air film lubricating effect in confined hull area 5) can be increased by extending the deck area, for example, to include phantom line deck area 8' of FIGS. 1 & 2.

Many variations of the preferred embodiment are of course possible. Although a multi-hull boat (catamaran, trimaran, etc.) is considered to be the most preferred application, the invention could conceivably be applied to a monohull boat. Moreover, although the rectangular-cross-sectional channel 2 with the same lateral dimension as the step-lift 14 is most preferred to produce a flat film flow, a vent pipe with a spreader could conceivably be used. Also, multiple, staged step-lifts could be used, each with its own air film system. Although a natural, free-flowing air opening 1 was found suitable for the preferred embodiment described and tested, an air compressor other pressurized source could conceivably be used in certain situations. It is also conceivable that additional air channels feeding into the same air film area are possible, although a single one feeding at the precise point of step-lift completely across its beam is most preferred.

Because of the many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed as invention is:

1. A watercraft of the step-lift planing type comprising:
    at least one hull having an intermediate step-lift at its bottom;
    an at least generally flat bottom hull portion aft of the step-lift, the underside of which is at least generally parallel to the water level;
    air channel means extending through the hull to and communicating with the step-lift area through an opening for producing an air stream vacuum break at the step-lift and a thin, substantially non-propulsive, relatively low pressure and velocity air film along substantially all of the bottom of the aft hull portion, said air channel means being substantially free of any mechanical pressure inducing means;
    retaining means comprising a pair of elongated, relatively narrow, edge protrusions located along each port and starboard edge of the hull at the bottom thereof and extended aft at least generally parallel to the hull and at least generally parallel each to the other from the step-lift area to the stern, the lower tip of each edge protrusion extending vertically downward beyond the bottom of said flat hull portion a very short distance to contact the surface of the water when the watercraft if underway and on plane, said retaining means and said bottom hull portion forming aft hull air film confining means to retain said thin film of air beneath substantially all the entire area of the hull aft the step-lift, said film of air being confined above by the bottom of said aft hull portion, confined below by the surface of the water, and confined laterally by the said pair of elongated protrusions, but having unimpeded egress at the stern.

2. The watercraft of claim 1 wherein said short distance is within the range of ¾ – ½.

3. The watercraft of claim 1 wherein the combined widths of said relatively narrow, edge protrusions is less than 20% of the total beam of the hull.

4. A watercraft of the step-lift planing type comprising:

at least one hull having an intermediate step-lift at its bottom;

an at least generally flat bottom hull portion aft of the step-lift, the underside of which is at least generally parallel to the water level;

air channel means extending through the hull to and communicating with the step-lift area through an opening for producing an air stream vacuum break at the step-lift and a thin substantially, non-propulsive, relatively low pressure and velocity air film along substantially all of the bottom of the aft hull portion;

retaining means comprising a pair of elongated, relatively narrow, edge protusions located along each port and starboard edge of the hull at the bottom thereof and extended aft at least generally parallel to the hull and at least generally parallel each to the other from the step-lift area to the stern, the lower tip of each edge protrusion extending vertically downward beyond the bottom of said flat hull portion a very short distance to contact the surface of the water when the watercraft is underway and on plane, said retaining means and said bottom hull portion forming aft hull air confining means to retain said thin film of air beneath substantially all the entire area of the hull aft the step-lift, said film of air being confined above by the bottom of said aft hull portion, confined below by the surface of the water, and confined laterally by the said pair of elongated protrusions, but having unimpeded egress at the stern, wherein said air channel means includes valve means for controlling the amount of air flow to said bottom hull portion aft of the step-lift to insure that an air film is created in that area regardless of sea and watercraft conditions, the air flowing within said air channel through said hull being otherwise unforced and free-flowing through said air channel means.

5. The watercraft of claim 1 wherein said hull includes chines which flow smoothly into said edge protrusions, the latter forming a smooth continuation of the former.

6. A watercraft of the step-lift planing type comprising:

at least one hull having an intermediate step-lift at its bottom;

an at least generally flat bottom hull portion aft of the step-lift, the underside of which is at least generally parallel to the water level;

air channel means extending through the hull to and communicating with the step-lift area through an opening for producing an air stream vacuum break at the step-lift and a thin substantially non-propulsion, relatively low pressure and velocity air film along substantially all of the bottom of the aft hull portion, wherein the opening from said air channel means to said step-lift area is a single contiguous one extending substantially across the full width of the hull; and retaining means comprising a pair of elongated, relatively narrow, edge protrusions located along each port and starboard edge of the hull at the bottom thereof and extended aft at least generally parallel to the hull and at least generally parallel each to the other from the step-lift area to the stern, the lower tip of each edge protrusion extending vertically downward beyond the bottom of said flat hull portion a very short distance to contact the surface of the water when the watercraft is underway and on plane, said retaining means and said bottom hull portion forming aft hull air film confining means to retain said thin film of air beneath substantially all the entire area of the hull aft the step-lift, said film of air being confined above by the bottom of said aft hull portion, confined below by the surface of the water, and confined laterally by the said pair of elongated protrusions, but having unimpeded egress at the stern, wherein the opening from said air channel means to said step-lift area is a single contiguous one extending substantially across the full width of said hull.

7. The watercraft of claim 6 wherein said air channel means extends from the top of said hull down through said hull to said step-lift area, the width of said air channel means through said hull extending at least substantially across the full width of said hull.

8. The watercraft of claim 7 wherein said air channel means through said hull is formed of two parallel, lateral partitions, said channel means thereby having a horizontal, rectangular cross-section.

9. A watercraft of the step-lift planing type comprising:

at least one hull having an intermediate step-lift at its bottom;

and at least generally flat bottom hull portion aft of the step-lift, the underside of which is at least generally parallel to the water level;

air channel means extending through the hull to and communicating with the step-lift area through an opening for producing an air stream vacuum break at the step-lift and a thin air film along substantially all of the bottom of the aft hull portion, wherein the opening from said air channel means to said step-lift area extends substantially across the hull width of said hull;

retaining means comprising a pair of elongated, relatively narrow, edge protrustions located along each port and starboard edge of the hull at the bottom thereof and extended aft at least generally parallel to the hull and at least generally parallel each to the other from the step-lift area to the stern, the lower tip of each edge protrusion extending vertically downward beyond the bottom of said flat hull portion a very short distance to contact the surface of the water when the watercraft is underway and on plane, said retaining means and said bottom hull portion forming aft hull air film confining means to retain said thin film of air beneath substantially all the entire area of the hull aft the step-lift, said film of air being confined above by the bottom of said aft hull portion, confined below by the surface of the water, and confined laterally by the said pair of elongated protrusions, but having unimpeded egress at the stern; and a hull portion immediately forward of said step-lift, which said hull portion is V shaped, the keel line of which extends below the bottom of said edge protrusions and the bottom of said aft hull portion, the rear of said hull portion immediately forward of said step-lift being completely open, defining a triangular opening, which forms the bottom opening of said air channel means into said aft hull air film confining means.

10. The watercraft of claim 1 wherein the ratio of said short distance to the beam of said hull is approximately 1:50.

11. A watercraft of the step-lift planing type comprising:
 at least one hull having an intermediate step-lift at its bottom;
 and at least generally flat bottom hull portion aft of the step-lift, the underside of which is at least generally parallel to the water level;
 air channel means extending through the hull to and communicating with the step-lift area through an opening for producing air stream vacuum break at the step-lift and a thin substantially non-propulsive, relatively low pressure and velocity air film along substantially all of the bottom of the aft hull portion;
 retaining means comprising a pair of elongated, relatively narrow, edge protrusions located along each port and starboard edge of the hull at the bottom thereof and extended aft at least generally parallel to the hull and at least generally each to the other from the step-lift area to the stern, the lower tip of each edge protrusion extending vertically downward beyond the bottom of said flat hull portion a very short distance to contact the surface of the water when the watercraft is underway and on plane, said retaining means and said bottom hull portion forming aft hull air film confining means to retain said thin film of air beneath substantially all the entire area of the hull aft the step-lift, said film of air being confined above by the bottom of said aft hull portion, confined below by the surface of the water, and confined laterally by the said pair of elongated protrusions, but having unimpeded egress at the stern, and wherein the ratio of the length of said aft hull portion to the over-all hull length is approximately 1:3.

12. A watercraft having a multiple number of the hulls of claim 1 arrayed laterally in parallel fashion.

13. The watercraft of claim 12 wherein said watercraft is an ocean-going catamaran having two hulls connectd by a deck.

14. A watercraft of the step-lift planing type comprising an ocean-going catamaran having two at least substantially identical hull elements connected together by a deck, each of said hull elements comprising:
 a hull having an intermediate step-lift at its bottom;
 an at least generally flat bottom hull portion aft of the step-lift, the underside of which is at least generally parallel to the water level;
 air channel means extending through the hull to an communicating with the step-lift area through an opening for producing an air stream vacuum break at the step-lift and a thin air film along substantially all of the bottom of the aft hull portion; said air channel means including valve means for controlling the amount of air flow to said bottom hull portion aft the step-lift to insure that an air film is created in that area regardless of sea and watercraft conditions, the opening from said air channel means to said step-lift area extending substantially across the full width of said hull, said air channel means extending from the top of said hull down through said hull down through said hull to said step-lift area, the width of said air channel means through said hull extending at least substantially across the full width of said hull; and
 retaining means comprising a pair of elongated, relatively narrow, edge protrusions located along each port and starboard edge of the hull at the bottom thereof and extended aft at least generally parallel to the hull and at least generally parallel each to the other from the step-lift area to the stern, the combined widths of said relatively narrow, edge protrusions being less than 20% of the total beam of the hull; the lower tip of each edge protrusion extending vertically downward beyond the bottom of said flat hull portion a very short distance to contact the surface of the water when the watercraft is underway and on plane, said short distance being within the range of ¾–¼, said hull further including chines which flow smoothly into said edge protrusions, the latter forming a smooth continuation of the former, said retaining means and said bottom hull portion forming confining means to retain said thin film of air beneath substantially all the entire area of the hull aft the step-lift, said film of air being confined above by the bottom of said aft hull portion, confined below by the surface of the water, and confined laterally by the said pair of elongated protrusions, but having unimpeded egress at the stern.

15. The watercraft of claim 14 wherein said air channel means through said hull is formed of two parallel, lateral partitions, said channel means thereby having a horizontal rectangular cross-section.

16. The watercraft of claim 14 wherein the hull portion immediately forward of said step-lift is V-shaped, the keel line of which extends below the bottom of said edge protrusions and the bottom of said aft hull portion, the rear of said hull portion immediately forward of said step-lift being completely open, defining a triangular opening, which forms the bottom opening of said air channel means into said aft hull air film confining means.

17. The watercraft of claim 13 wherein the ratio of said short distance to the beam of said hull is approximately 1:50.

18. A watercraft of the step-lift planing type comprising; at least one hull having an intermediate steplift at its bottom;
 an at least generally flat bottom hull portion aft of the step-lift, the underside of which is at least generally parallel to the water level;
 air channel means extending through the hull to and communicating with the step-lift area area through an opening for producing an air stream vacuum break at the step-lift and a thin substantially non-propulsive, relatively low pressure and velocity air film along substantially all of the bottom of the aft hull portion;
 retaining means comprising a pair of elongated, relatively narrow, edge protrusions located along each port and starboard edge of the hull at the bottom thereof and extended aft at least generally parallel the hull and at least generally parallel each to the other from the step-lift area to the stern, the lower tip of each edge protrusion extending vertically downward beyond the bottom of said flat hull portion a very short distance to contact the surface of the water when the watercraft is underway and on plane, said retaining means and said bottom hull portion forming aft hull air film confining means to retain said thin film of air beneath substantially all the entire area of the hull aft the step-lift, said film of air being confined above by the bottom of said aft hull portion, confined below by the surface of the water, and confined laterally by the said pair of elongated protrusions, but having unimpeded egress at the stern, wherein the ratio of the length of said aft hull portion to the over-all hull length is approximately 1–3;
 said watercraft having a plurality of hulls of the type herein defined, arrayed laterally in a parallel fashion.

* * * * *